(12) United States Patent
Bohne

(10) Patent No.: US 8,900,731 B2
(45) Date of Patent: Dec. 2, 2014

(54) CHARGER SYSTEM FOR COMMUNICATION DEVICES USING A CHARGER CIRCUIT TO COMMUNICATE A CHARGE STATUS TO A PORTABLE HOST DEVICE

(75) Inventor: William C. Bohne, Lawrenceville, GA (US)

(73) Assignee: Motorola Solutions, Inc., Schaumburg, IL (US)

(*) Notice: Subject to any disclaimer, the term of this patent is extended or adjusted under 35 U.S.C. 154(b) by 1767 days.

(21) Appl. No.: 11/844,604

(22) Filed: Aug. 24, 2007

(65) Prior Publication Data

US 2009/0051327 A1    Feb. 26, 2009

(51) Int. Cl.
*H02J 7/00* (2006.01)

(52) U.S. Cl.
CPC ............... *H02J 7/004* (2013.01); *H02J 7/0021* (2013.01); *H02J 7/0047* (2013.01)
USPC ................................. 429/7; 320/112; 320/107

(58) Field of Classification Search
USPC ................. 320/132, 149, 163, 106, 107, 112; 429/61, 90, 7
See application file for complete search history.

(56) References Cited

U.S. PATENT DOCUMENTS

| | | | | |
|---|---|---|---|---|
| 4,885,523 A * | 12/1989 | Koenck | ...................... | 320/131 |
| 5,278,487 A * | 1/1994 | Koenck | ...................... | 320/132 |
| 5,592,095 A | 1/1997 | Meadows | | |
| 5,600,230 A | 2/1997 | Dunstan | | |
| 5,736,835 A * | 4/1998 | Nakajo et al. | ................. | 320/112 |
| 5,861,732 A * | 1/1999 | Takimoto et al. | ............. | 320/132 |
| 5,932,989 A * | 8/1999 | Thandiwe et al. | ............ | 320/106 |
| 5,982,147 A * | 11/1999 | Anderson | ..................... | 320/132 |
| 6,005,367 A * | 12/1999 | Rohde | ........................ | 320/106 |
| 6,078,871 A * | 6/2000 | Anderson | ....................... | 702/63 |
| 6,157,169 A * | 12/2000 | Lee | .............................. | 320/132 |
| 6,316,916 B2 * | 11/2001 | Bohne | ......................... | 320/150 |
| 7,271,568 B2 * | 9/2007 | Purdy et al. | ................... | 320/106 |
| 7,352,152 B2 * | 4/2008 | Kawaguchi et al. | .......... | 320/106 |
| 2004/0160210 A1 | 8/2004 | Bohne | | |

OTHER PUBLICATIONS

International Search Report and Written Opinion for counterpart International Application No. PCT/US2008/073827, mailed on Dec. 12, 2008.
Notification of the First Office Action mailed May 22, 2012 in counterpart Chinese Patent Application No. 200880104162.2.
Notification of the Second Office Action Jan. 14, 2013 in counterpart Chinese Patent Application No. 200880104162.2.

* cited by examiner

*Primary Examiner* — Yalkew Fantu
*Assistant Examiner* — Manuel Hernandez
(74) *Attorney, Agent, or Firm* — Barbara R. Doutre; Daniel R. Bestor; Randi L. Karpinia

(57) ABSTRACT

A charger system (100) for charging a battery power source for a portable host device (102) is provided. The charger system includes a charger circuit (202). The charger circuit operates to communicate a charge status. The charge status can be selected from a charge status group including a charging status and a charge completed status. Further, the charger system includes a battery (108) coupled between the portable host device and the charger circuit. The battery includes a switch circuit (206) operating to switch communication to the portable host device in response to the charge status communicated from the charge circuit. The charger system also includes the portable host device.

14 Claims, 5 Drawing Sheets ured to scale. For example, the dimensions of

CHARGER SYSTEM FOR COMMUNICATION DEVICES USING A CHARGER CIRCUIT TO COMMUNICATE A CHARGE STATUS TO A PORTABLE HOST DEVICE

FIELD OF THE INVENTION

The present invention relates in general to the field of portable communication devices, and more specifically, to a charger system for a portable communication device.

BACKGROUND OF THE INVENTION

Portable communication devices are becoming an increasingly prevalent part of everyday life. Examples of such devices include, but are not limited to, mobile and cordless phones, two-way radio systems and messaging devices. Typically, these devices operate on the power stored in the attached batteries. During charging of the attached batteries by a separate charger system, most portable communication devices are programmed to continue to perform their functions in the usual manner.

A portable communication device can include a display screen, which displays information about the device to a user. The information can be, for example, the date or time, a communication network of the communication device, the battery charge status, and the like.

In most modern communication devices, such as mobile or cellular telephones, the device contains circuitry and firmware to perform the battery charging while the battery is attached to the device. The 'battery charge' status displayed on the display screen is controlled by the device; and during the charge process the device can monitor the charge status and, thereby control the battery display, changing the display as the battery is charged. Unless the battery is fitted with a means of digitally monitoring (i.e. coulomb counting, and the like.) the remaining capacity in the battery, portable communication devices typically detect battery charge status by monitoring the battery voltage.

If the device does not have the ability to communicate with the battery to read a coulomb counter, the communication device can monitor the battery voltage. However, the voltage displayed by a battery under charge is different from that of a battery under load or at rest. When an external charger is connected to a portable communication device which does not have an embedded charger to charge the attached battery, the information displayed on the screen of the portable communication device may substantially differ from the actual battery capacity. For example, a two-way radio using a voltage-based fuel gauge may indicate a "battery low" status on the display screen, even when the battery is in the process of being charged. This may cause inconvenience for the user of the two-way radio system.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Figure 1:
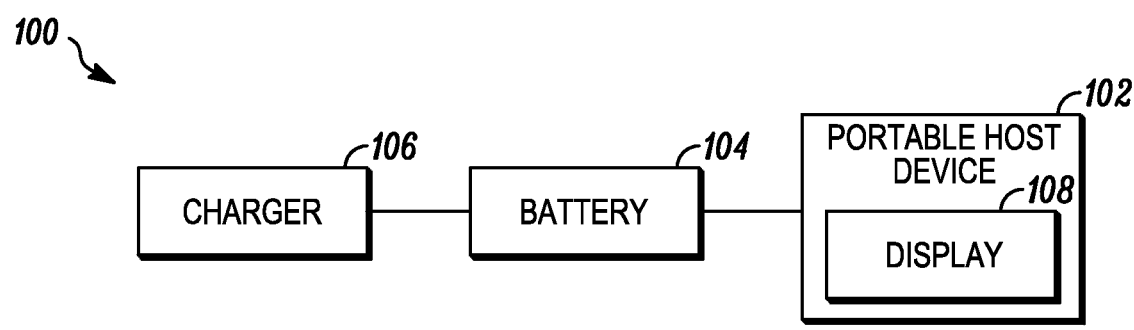
FIG. 1 illustrates a block diagram of a charger system, in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of the embodiments of the present invention.

DETAILED DESCRIPTION

Before describing in detail the particular charger system for a portable communication device, in accordance with various embodiments of the present invention, it should be observed that the present invention utilizes a combination of apparatus components that are related to a charger system for a portable communication device. Accordingly, the apparatus components have been represented where appropriate by conventional symbols in the drawings, showing only those specific details that are pertinent for an understanding of the present invention, so as not to obscure the disclosure with details that will be readily apparent to those of ordinary skill in the art, having the benefit of the description herein.

In this document, the terms 'comprises,' 'comprising' or any other variation thereof, are intended to cover a non-exclusive inclusion, such that a process, method, article or apparatus that comprises a list of elements does not include only those elements but may include other elements that are not expressly listed or inherent in such a process, method, article or apparatus. An element proceeded by 'comprises . . . a' does not, without more constraints, preclude the existence of additional identical elements in the process, method, article or apparatus that comprises the element. The term "another," as used in this document, is defined as at least a second or more. The terms "includes" and/or "having", as used herein, are defined as comprising. The term "another," as used in this document, is defined as at least a second or more.

For one embodiment, a charger system for a portable host device is provided. The charger system includes a charger circuit. The charger circuit operates to communicate a charge status. The charge status can be selected from a charge status group including a charging status and a charge completed status. Further, the charger system includes a battery coupled between the portable host device and the charger circuit. The battery includes a switch circuit operating to switch communication to the portable host device in response to the charge status communicated from the charge circuit. The charger system also includes the portable host device.

For another embodiment, a charger system for a portable host device is provided. The charger system includes a charger circuit. Further, the charger system includes the portable host device. The portable host device includes a pull-up host resistor electrically coupling a host side communication line to a supply voltage. Further, the portable host device includes a radio data line control for detecting a state of the host side communication line. Furthermore, the portable host device includes a display for displaying a battery charge status. The charger system also includes a battery coupled between the charger circuit and the portable host device. The battery includes a transistor Q1, a first resistor R1, a second resistor R2 and a battery Erasable Programmable Read-Only Memory (EPROM) U2. The first resistor R1 is electrically coupled between a gate of the transistor Q1 and the second resistor R2. The second resistor R2 is electrically coupled between the first resistor R1 and ground. The battery EPROM U2 is electrically coupled between the transistor Q1 and the portable host device. The transistor Q1 is held OFF by the series combination of the first resistor R1 and the second resistor R2 allowing the portable host device pull-up host resistor to bias the host side communication line high, when the battery is attached to the portable host device and the portable host device is operating without the charger circuit attached. Further, the radio data line control of the portable host device is programmed to detect the host side communication line high. Furthermore, the radio data line control is programmed to enable radio communication with the battery EPROM U2. The radio data line control is also programmed to cause the portable host device to display a battery not charging as the state of the battery on the display.

FIG. 1 illustrates a block diagram of a charger system 100, in accordance with at least one embodiment of the present invention. The charger system 100, as illustrated, includes a portable host device 102, a battery 104 and a charger 106. For one embodiment, the portable host device 102 can be, for example, a portable communication device such as a two-way radio system, mobile or cordless phone, messaging device, and the like. Typically, the portable host device 102 operates using the power stored in the battery 104 as its power source. When the power stored in the battery 104 drops below a certain level, a user of the portable host device 102 can connect the battery 104 to the charger 106 to charge the battery 104.

Further, the portable host device 102 can include a notification mechanism which can convey useful information to the user of the portable host device 102. The notification mechanism can be a visual, audible, tactile, or any equivalent means. The notification mechanism can provide information such as a message, battery fuel gauge information, date or time information, and the like to the user. The notification mechanism can further provide the present state-of-charge information of the battery 104.

The notification mechanism, in one embodiment, as illustrated, can be a display 108. The display 108 can be, for example, a voltage-based, multiple segment display, a liquid crystal display, a cathode ray tube display, a light emitting diode display, a plasma display or an equivalent. The display 108 can provide information such as a text message, battery fuel gauge information, date or time information, and the like. The display 108 can further display the present state-of-charge information of the battery 104. For example, during the charging process of the battery 104, the display 108 displays the 'battery charging' status. This indicates to the user that the battery 104 is being charged by using the charger 106. The battery charging status can be displayed by using a text message, a graphical representation such as a symbol or group of symbols, an icon, or any equivalent method.

Once the battery 104 is fully charged, the 'battery charging' status can be changed to a 'battery charged' status on the display 108. The 'battery charged' status can be displayed by using a text message, a graphical representation such as a symbol or group of symbols, an icon, or any equivalent method. When the 'battery charged' status is displayed on the display 108, the charger 106 can be removed from the battery 104 and the battery 104 will be typically at full power for use as a power source for the portable host device 102. For one embodiment, when the charger 106 is removed, the display 108 can display the percentage of power present in the battery 104 by using a text message, a graphical representation such as a symbol or group of symbols, an icon, or any equivalent method.

Figure 2:
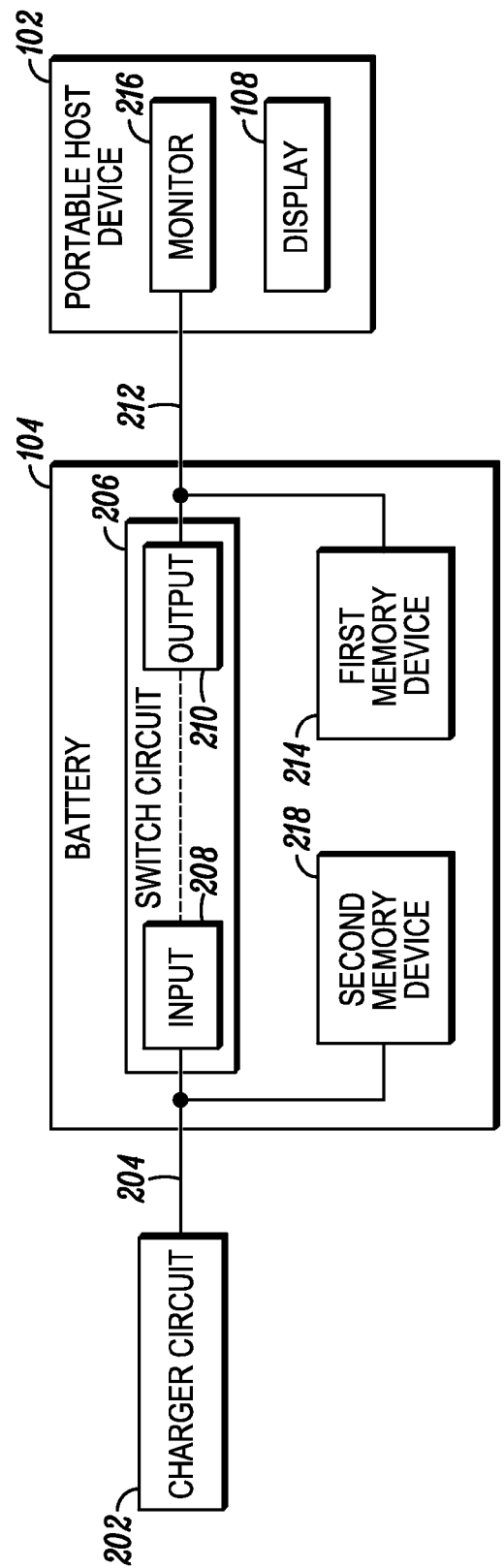
FIG. 2 is a block diagram illustrating further detail of the charger system of FIG. 1, in accordance with some embodiments of the present invention.

FIG. 2 illustrates further detail of the charger system 100 of FIG. 1, in accordance with some embodiments of the present invention. As illustrated and discussed previously herein, the charger system 100 includes the portable host device 102, the battery 104 and a charger circuit 202. For example, the charger circuit 202 can be contained with the charger 106 (not shown). The charger circuit 202 is used to charge the battery 104 of the portable host device 102. For one embodiment, the portable host device 102 is operable while coupled to the charger circuit 202. Further, the charger circuit 202 can be used to communicate a charge status to the portable host device 102. The charge status is the state-of-charge information of the battery 104. The portable host device 102 can use the charge status to correctly display the state-of-charge information of the battery 104 on the display 108. The charge status can be selected from a charge status group, which can include, for example, the charging status of the battery 104 and the charge completed status of the battery 104. The 'charging' status of the battery 104 may also indicate that the battery is in the process of being charged. For example, when the charger circuit 202 is connected to the battery 104 and the battery 104 is being charged, the charge status will be "charging". When the charger circuit 202 is not connected to the battery 104 or alternatively the charger circuit 202 is connected to the battery 104 and the battery 104 is completely charged, the charge status can be, for example, "charge completed" or alternatively "not charging".

For one embodiment, the charger circuit 202 communicates the charge status to the portable host device 102 through the battery 104. The charger circuit 202 communicates the charge status to the battery 104 via a charger side communication line 204. The state of the charger side communication line 204 can identify the charge status. For example, the charger side communication line 204 can be biased high when the charge status is "charging", and the charger side communication line 204 can be biased low when the charge status is "charge completed". The battery 104 includes a switch circuit 206, which facilitates the communication of the charge status between the charger circuit 202 and the portable host device 102. To establish the communication, the switch circuit 206 includes an input 208 and an output 210. The input 208 and the output 210 can be connected to each other.

The input 208 can be coupled to the charger circuit 202 through the charger side communication line 204. The input 208 determines the charge status on the basis of the biasing of the charger side communication line 204. This charge status can then be communicated to the output 210. For one embodiment, the output 210 is coupled to the portable host device 102 through a host side communication line 212. The state of the host side communication line 212 can identify the charge status. For example, the host side communication line 212 can be biased low when the charge status is "charging", and the host side communication line 212 can be biased high when the charge status is "charge completed". As a result, the switch circuit 206 operates to switch communication to the portable host device 102 depending on the charge status communicated from the charger circuit 202.

For one embodiment, the charger circuit 202 applies a direct current (DC) voltage-level charge status to the input 208 for a pre-defined period of time. The DC voltage-level charge status can indicate the charge status of the battery 104 to the input 208. For one embodiment, the DC voltage-level charge status is the DC voltage level. For example, a DC voltage level of five volts (5V) may indicate to the input 208 that the charge status is "charging". On the other hand, a DC voltage level of zero volts (0V) may indicate that the charge status is "charge completed". When the charge status is charge completed, the battery 104 is fully charged, or the charger circuit 202 is disconnected from the battery 104.

Further, the input 208 can cause the output 210 to switch the host side communication line 212 to ground when the DC voltage level is applied for a time duration that is greater than a time constant of an input circuit. The input circuit is explained in detail later in conjunction with FIG. 5. Further, if the period of time for which the DC voltage level is applied to the input 208, exceeds the time constant, the host side communication line 212 is selectively switched to ground by the output 210. For example, if the charger circuit 202 applies a DC voltage level of five volts (5V) for a duration of fifteen (15) milliseconds to the input 208, and the time constant is set to ten (10) milliseconds, the output 210 causes the host side communication line 212 to switch to ground. On the other hand, the host side communication line 212 is not switched to ground if the time period for which the DC voltage level is applied is less than the time constant. In this case, data communication between the charger circuit 202 and the battery 104 is enabled through the charger side communication line 204 without switching the host side communication line 212 to ground. Consequently, the battery 104 communicates with the charger circuit 202 and the portable host device 102 simultaneously.

The battery 104 can also include a first memory device 214, to communicate with a monitor 216 of the portable host device 102 via the host side communication line 212. The monitor 216 monitors the status of the host side communication line 212, thereby identifying whether the host side communication line 212 is grounded. For one embodiment, the first memory device 214 can be, for example, an Erasable Programmable Read-Only Memory (EPROM). When the host side communication line 212 is switched to ground, the portable host device 102 is not able to read from the first memory device 214. Consequently, the portable host device 102 identifies this state as an indication that the battery is in the process of being charged and displays 'charging status' on the display 108. On the other hand, if the host side communication line 212 is not switched to ground, the portable host device 102 can read the first memory device 214. Consequently, the display 108 can display the data stored in the first memory device 214. For one embodiment, the first memory device 214 can store a value or a table of values referencing a corresponding power remaining in the battery 104 as recorded by the portable host device 102. For example, if there is forty (40) percent of power available in the battery 104, the display 108 can display a graphical value corresponding to forty (40) percent of power.

The first memory device 214 can also include a battery memory (not shown) which stores the pre-characterized battery design discharge profile data of the battery 104. Further, the first memory device 214 is configured to communicate the pre-characterized battery design discharge profile data to the portable host device 102, to optimize fuel gauge accuracy. The pre-characterized battery design discharge profile data can be, for example, a table of values that represents the relationship between the percentage value of the power available in the battery 104 and a voltage data measurement of the battery 104 taken by the portable host device 102. For example, if the portable host device 102 reads the table of data from the first memory device 214 and the portable host device 102 also takes a measurement of the battery voltage, then the portable host device 102 compares the measured value to the table of data read from the first memory device 214. If, for example, from the table, the measured value corresponds to ten (10) percent of power in the battery 104, the portable host device 102 can display this information on the display 108. Based on the information shown on the display 108, a user of the portable host device 102 can gauge the percentage of the power available in the battery 104.

Similarly, as illustrated, the battery 104 can include a second memory device 218 to communicate with the charger circuit 202 via the charger side communication line 204. The second memory device 218, for example, can be an Erasable Programmable Read-Only Memory (EPROM). The second memory device 218 can store the charging parameters of the battery 104.

Figure 3:
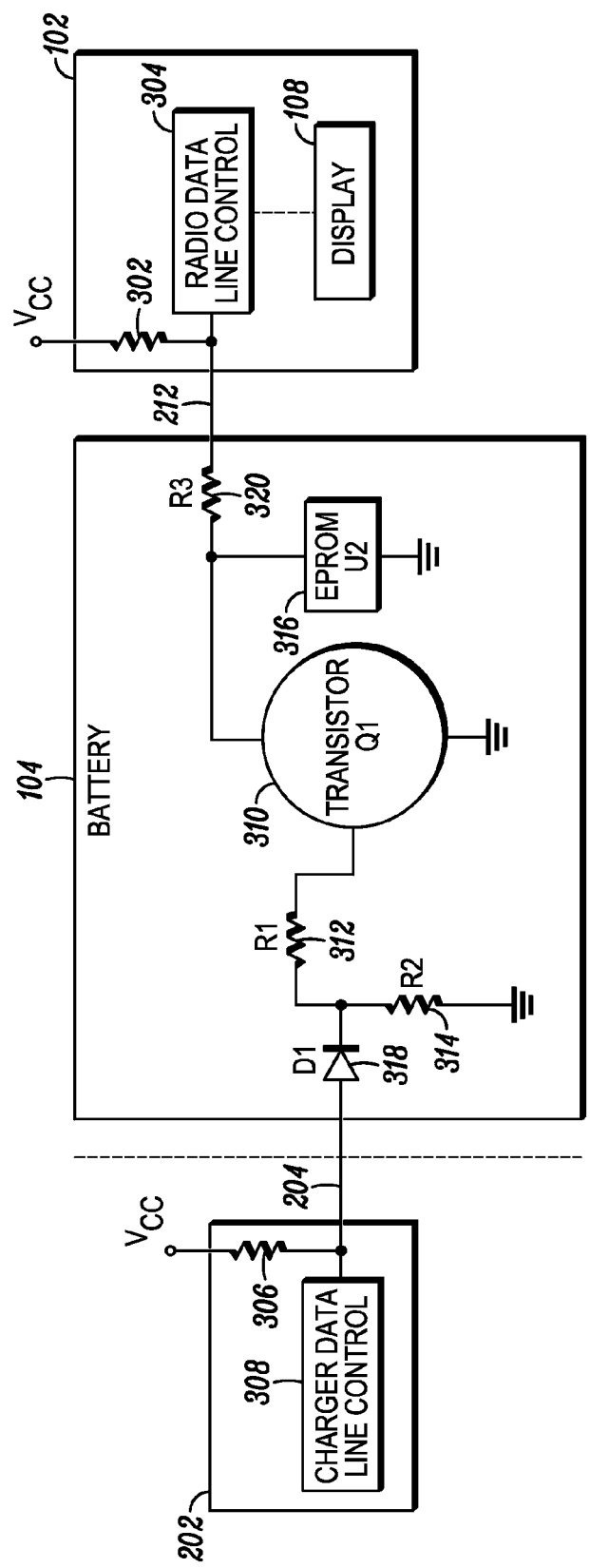
FIG. 3 is a block diagram illustrating further detail of the charger system of FIG. 1, in accordance with some embodiments of the present invention.

FIG. 3 is a block diagram illustrating further detail of the charger system 100 of FIGS. 1 and 2, in accordance with some embodiments of the present invention. The charger system 100, as described previously herein, includes the charger circuit 202, the portable host device 102, and the battery 104. For one embodiment, the portable host device 102 can include a pull-up host resistor 302, a radio data line control 304 and the display 108. The pull-up host resistor 302 electrically couples the host side communication line 212 to a supply voltage $V_{cc}$. The radio data line control 304 is configured to detect the status of the host side communication line 212. The display 108 of the portable host device 102 is also configured to display the charge status of the battery 104.

The charger circuit 202 can include a pull-up charger resistor 306 and a charger data line control 308. The pull-up charger resistor 306 is electrically coupled to the charger side communication line 204 and a supply voltage $V_{cc}$. The charger data line control 308 can be configured to decide the bias of the charger side communication line 204. For example, when the charger circuit 202 is connected to the battery 104, the charger data line control 308 can bias the charger side communication line 204 high. Conversely, when the charger circuit 202 is disconnected from the battery 104, the charger side communication line 204 can be biased low by the charger data line control 308. The functioning of the pull-up charger resistor 306 and the charger data line control 308 is explained in detail in conjunction with FIG. 4.

As illustrated, the battery 104 is coupled to the charger circuit 202 and the portable host device 102. The battery 104 can include a transistor Q1 310, a first resistor R1 312, a second resistor R2 314, a battery EPROM U2 316, a diode D1 318 and a third resistor R3 320. The first resistor R1 312 is electrically coupled to the gate of the transistor Q1 310 and the second resistor R2 314. Further, the second resistor R2 314 is electrically coupled between the first resistor R1 312 and the ground. Furthermore, the battery EPROM U2 316 is electrically coupled to the transistor Q1 310 and the ground. The third resistor R3 320 is electrically coupled to the transistor Q1 310 and the host side communication line 212. The diode D1 318 is coupled to the charger side communication line 204 and the resistor R2 314.

When the portable host device 102 is not charging, or when it is not connected to the charger circuit 202, the charger side communication line 204 is biased low. The dotted line in FIG. 3 indicates that the battery 104 is not getting charged and the charger side communication line 204 is biased low. Those of ordinary skill in art will appreciate that the dotted line is drawn to assist in describing the figure, and does not affect the functioning of the invention in any way.

When the charger side communication line 204 is biased low, the diode D1 318 is reverse-biased. The reverse biasing of the diode D1 318 causes the first resistor R1 312 and the second resistor R2 314 to be in a series combination. The series combination of the first resistor R1 312 and the second resistor R2 314 causes transistor Q1 310 to go into the OFF state. When the transistor Q1 310 is OFF, the pull-up host resistor 302 biases the host side communication line 212 high.

The radio data line control 304 is used to detect the state of the host side communication line 212. When the host side communication line 212 is detected to be high, the radio data line control 304 is programmed to enable radio communication with the battery EPROM U2 316. Further, the radio data line control 304 is programmed to cause the portable host device 102 to display the 'battery not charging' state as the state-of-charge of the battery 104 when it detects that the host side communication line 212 is high. For one embodiment, the portable host device 102 displays a 'charge completed' status on the display 108 when the host side communication line 212 is detected as high.

For one embodiment, the radio data line control 304 can be connected to the display 108. Further, the display 108 can display the value computed from the table of data stored in the battery EPROM U2 316 and the battery voltage measured by the portable host device 102 instead of "battery not charging" when the host side communication line 212 is detected as high. This value can be communicated to the radio data line control 304 when the host side communication line 212 is biased high.

Although the FIG. 3 shows the portable host device 102 and the battery 104 as separate entities, it will be appreciated by those of ordinary skill in the art that the battery 104 can be included within the portable host device 102. Similarly, the present invention can also function with a portable host device incorporating the charger circuit 202 and the battery 104 within.

Figure 4:
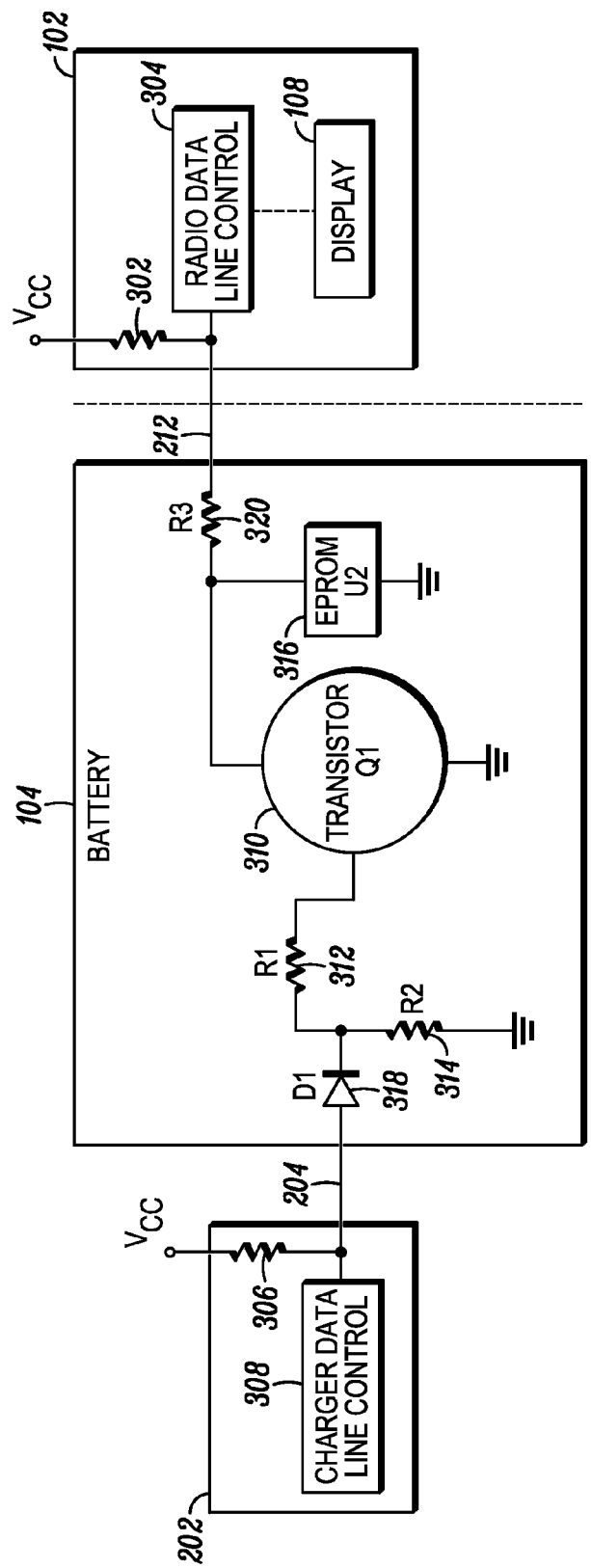
FIG. 4 is a block diagram illustrating further detail of the charger system of FIG. 1, in accordance with some embodiments of the present invention.

FIG. 4 is a block diagram illustrating further detail of the charger system 100, in accordance with some embodiments of the present invention. The charger system 100, as described previously herein, includes the portable host device 102, the battery 104 and the charger circuit 202. As illustrated, the charger circuit 202 is coupled to the portable host device 102 through the battery 104. The functioning of the components of the portable host device 102 are as explained previously herein in conjunction with FIG. 3.

As described previously herein in conjunction with FIG. 3, the battery 104 can include the transistor Q1 310, the first resistor R1 312, the second resistor R2 314, the battery EPROM U2 316, the diode D1 318 and the third resistor R3 320. For one embodiment, the diode D1 318 is coupled to the charger side communication line 204 and the transistor Q1 310.

When the battery 104 is in the process of being charged and is connected to the charger circuit 202, the charger side communication line 204 is high. When the charger side communication line 204 is biased high, the pull-up charger resistor 306 can forward bias the diode D1 318, which results in the transistor Q1 310 being turned ON. When the transistor Q1 310 is turned ON, the host side communication line 212 is biased low, as the series combination of the third resistor R3 320 and the pull-up host resistor 302 is grounded.

When the host side communication line 212 is biased low, the portable host device 102 can not maintain radio communication with the battery 104. The dotted line in FIG. 4 shows that the host side communication line 212 is biased low and the portable host device 102 is not able to maintain radio communication with the battery 104. Those of ordinary skill in the art will appreciate that the dotted line is drawn to assist in describing the figure and does not affect the functioning of the invention in any way.

When the host side communication line 212 is biased low, the radio data line control 304 detects that radio communication with the battery EPROM U2 316 is not operational. When the radio data line control 304 is not able to establish radio communication with the battery EPROM U2 316, the portable host device 102 displays the battery charging state on the display 108. The battery charging state can be a graphical representation such as a symbol or symbols indicating the state-of-charge of the battery 104, a text message indicating that the battery 104 is being charged, or any equivalent notification method.

Figure 5:
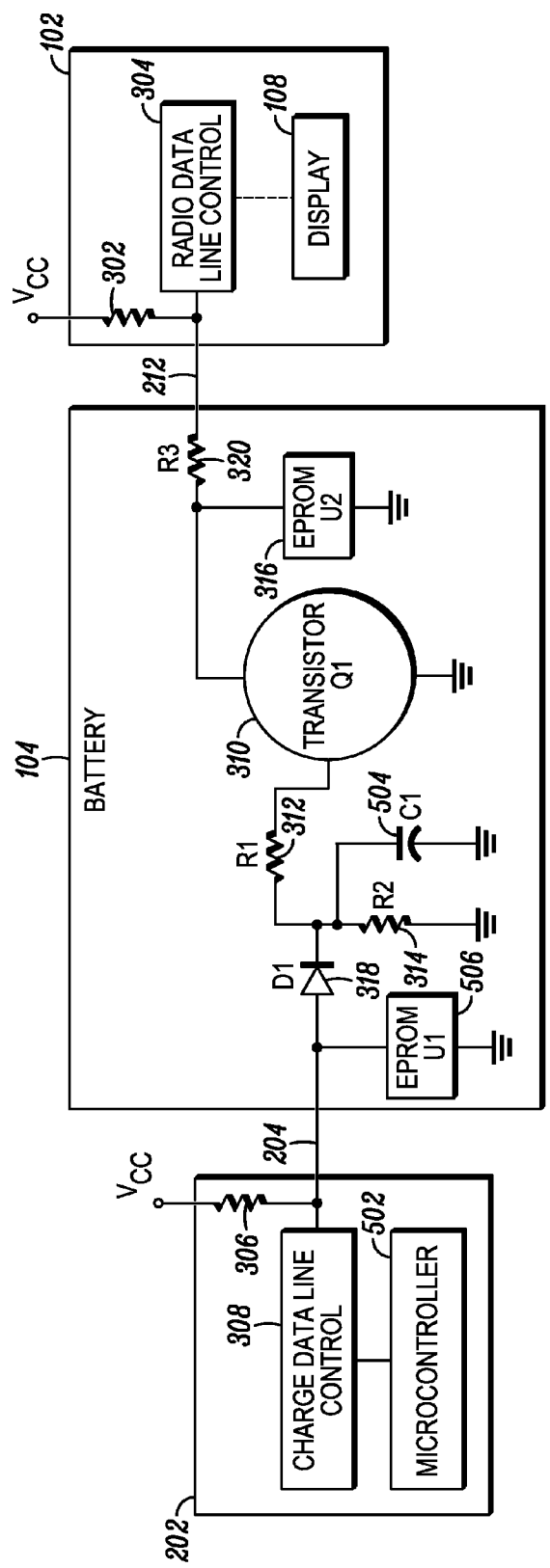
FIG. 5 is a block diagram illustrating further detail of the charger system of FIG. 1, in accordance with some embodiments of the present invention.

FIG. 5 is a block diagram illustrating further detail of the charger system 100, in accordance with some embodiments of the present invention. As described previously herein, the charger system 100 can include the portable host device 102, the battery 104 and the charger circuit 202. The charger circuit 202 includes a microcontroller 502, in addition to the pull-up charger resistor 306 and the charger data line control 308. For one embodiment, the microcontroller 502 is connected to the charger data line control 308.

The battery 104 includes the components as previously described herein in conjunction with FIG. 4, and the battery 104 can also include a capacitor C1 504 and a charger side EPROM U1 506. For one embodiment, the charger side EPROM U1 506 can be the second memory device 218, as described previously herein in conjunction with FIG. 2. Further, the input circuit, as described previously herein in conjunction with FIG. 2, can include the capacitor C1 504 and the charger side EPROM U1 506, along with the diode D1 318, the first resistor R1 312 and the second resistor R2 314. Furthermore, the time constant of the input circuit can be formed by the combination of the capacitor C1 504 and the pull-up charger resistor 306. For example, the time constant of the circuit shown in the FIG. 5 can be approximated by multiplying the value of the capacitor C1 504 and the value of the pull-up charger resistor 306 minus the value of the capacitor C 1504 and the value of the second resistor R2 314.

For one embodiment, the microcontroller 502 can be programmed to read the data from the charger side EPROM U1 506. While the microcontroller 502 is reading the data from the charger side EPROM U1 506, the gate of the transistor Q1 310 is biased ON, to keep the transistor Q1 310 in the ON state to prevent the portable host device 102 from receiving a false "charge completed" indication on the host side communication line 212. This is necessary since when the microcontroller 502 is reading the data from the charger side EPROM U1 506, the transistor Q1 310 may toggle between the ON and OFF states. To prevent the transistor Q1 310 from going into the OFF state when the microcontroller 502 is reading the data, the diode D1 318, the capacitor C1 504 and the pull-up charger resistor 306 and the capacitor C1 504 and the second resistor R2 314 form a time constant, which keeps the gate of the transistor Q1 310 biased ON until the data communication is completed. The diode D1 318 provides for a charge time constant, pull-up charger resistor 306 and C1 504 with R2 314 in parallel, while C1 504 and R2 314 provide a discharge time constant.

When the process of charging the battery 104 is complete, the time constant described previously herein expires, enabling the transistor Q1 310 to be turned OFF. When the transistor Q1 310 is turned OFF, the radio data line control 304 can sense that the host side communication line 212 is biased high by the pull-up host resistor 302. Consequently, the radio data line control 304 can read the data from the battery EPROM U2 316 or the state of the radio data line control 304 and display the charge status as "charge completed" on the display 108.

Various embodiments, as described above, provide a charger system for a portable communication device. The present invention enables a portable host device to display the state-of-charge information of the battery of the portable host device correctly. The host device changes the display screen information to a "battery charging" status when the battery is getting charged, to indicate to the user of the device that the battery is in the charging mode. Further, when the battery is fully charged, the display is changed to "charging complete". This informs the user that the battery is completely charged and therefore he/she can disconnect the charger from the portable host device.

It will be appreciated that embodiments of the invention described herein may comprise one or more conventional processors and unique stored program instructions that control the one or more processors, to implement, in conjunction with certain non-processor circuits, some, most or all of the functions of the embodiments of the invention described herein. The non-processor circuits may include, but are not limited to, a radio receiver, a radio transmitter, signal drivers, clock circuits, power source circuits and user input devices. Some or all the functions can be implemented by a state machine that has no stored program instructions, or in one or more application-specific integrated circuits (ASICs), in which each function or some combinations of certain of the functions are implemented as custom logic. Of course, a combination of these approaches could be used. Thus, means for these functions have been described herein. In those situations where functions of the embodiments of the invention can be implemented by using a processor and stored program instructions, it will be appreciated that a means for implementing such functions is the media that stores the stored program instructions, be it magnetic storage or a signal conveying a file. Further, it is expected that one with ordinary skill, notwithstanding possibly significant effort and many design choices motivated by, for example, available time, current technology and economic considerations, when guided by the concepts and principles disclosed herein, will be readily capable of generating such stored program instructions and ICs with minimal experimentation.

In the foregoing specification, the invention and its benefits and advantages have been described with reference to specific embodiments. However, one with ordinary skill in the art will appreciate that various modifications and changes can be made, without departing from the scope of the present invention, as set forth in the claims. Accordingly, the specification and the figures are to be regarded in an illustrative rather than a restrictive sense, and all such modifications are intended to be included within the scope of the present invention. The benefits, advantages, solutions to problems, and any element (s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims, as issued.

The Abstract of the disclosure is provided to comply with 37 C.F.R. §1.72(b), which requires an abstract that enables a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment, for the purpose of streamlining the disclosure. This method of disclosure is not to be interpreted as reflecting an intention that the claimed embodiments require more features than are expressly recited in each claim. Rather, as the following claims reflect, the inventive subject matter lies in less than all the features of a single disclosed embodiment. Thus, the following claims are hereby incorporated into the Detailed Description, with each claim standing on its own as a separately claimed subject matter.

What is claimed is:

1. A charger system for a portable host device comprising:
   a charger circuit operating to communicate a charge status using a charger side communication line selected from a charging status and a charge completed status;
   a battery coupled between the portable host device and the charger circuit, the battery comprising a switch circuit connected to the charger side communication line and operating to switch communication to the portable host device in response to the charge status communicated from the charger circuit;
   the portable host device;
   wherein the charger circuit communicates the charge status by a DC voltage level charge status using the charger side communication line;
   wherein the switch circuit comprises:
      an output coupled to the portable host device which selectively switches a host side communication line to ground, and
      an input coupled to the charger circuit which causes the output to switch upon application of a DC voltage level of sufficient duration to exceed a time constant of an input circuit;
   wherein the battery further comprises:
      a first memory device for communication with the portable host device via the host side communication line, the first memory device is connected with the portable host device independent of the charge status but is readable only by the portable host device when the charge status is the charge completed status; and
      a second memory device for communication with the charger circuit via the charger side communication line, the second memory device is connected with the charger circuit independent of the charge status through charger side communication line.

2. The charger system as claimed in claim 1, wherein the input of the switch circuit further allows data communication between the charger circuit and the battery via the charger side communication line without switching the host side communication line to ground when the DC voltage level is not of sufficient duration to exceed the time constant of the input circuit.

3. The charger system as claimed in claim 1, wherein the portable host device comprises a monitor for monitoring the status of the host side communication line, the monitor displaying the charge status.

4. The charger system as claimed in claim 1, wherein the battery further comprises a battery memory device to communicate pre-characterized battery design discharge profile data from the battery to the portable host device to optimize fuel gauge accuracy.

5. The charger system as claimed in claim 4, wherein the portable host device further comprises:
   a means to communicate with the battery memory device.

6. The charger system as claimed in claim 1, wherein the portable host device comprises a voltage-based, multiple segment user display to present state-of-charge information to a user of the portable host device based on the charge status provided from the charger circuit.

7. The charger system as claimed in claim 1, wherein the portable host device is operable while coupled to the charger circuit.

8. A charger system for a portable host device comprising:
a charger circuit;
a portable host device comprising:
  a pull-up host resistor that electrically couples a host side communication line to a supply voltage,
  a radio data line control for detecting a state of the host side communication line, and
  a display for displaying a battery charge state; and
a battery coupled between the charger circuit and the portable host device, the battery comprising:
  a transistor,
  a first resistor electrically coupled between a gate of the transistor and a second resistor,
  the second resistor electrically coupled between the first resistor and ground, and
  a battery Erasable Programmable Read-Only Memory (EPROM) electrically coupled between the transistor and the ground,
wherein when the battery is attached to the portable host device and the portable host device is operating without the charger circuit attached, the transistor is held off by the series combination of the first resistor and the second resistor, allowing the pull-up host resistor to bias the host side communication line high, and
further wherein the radio date line control of the portable host device is programmed to:
  detect the host side communication line high,
  enable radio communication with the battery EPROM, and
  cause the portable host device to display a battery not charging state as the battery charge state on the display.

9. The charger system as claimed in claim 8, wherein the charger circuit comprises:
a pull-up charger resistor that electrically couples a charger side communication line to the supply voltage, and
a charger data line control circuit,
wherein the battery further comprises:
  a diode coupled between the charger side communication line and the transistor,
wherein when the charger circuit is coupled to the battery and the portable host device, the pull-up charger resistor forward biases the diode, turning on the transistor,
wherein when the transistor is turned on, the host side communication line is biased low through a resistor and the pull-up host resistor,
further wherein the radio data line control of the portable host device is programmed to:
  detect the host side communication line low,
  detect the inability for radio communication with the battery EPROM, and
  cause the portable host device to display a battery charging state as the battery charge state on the display.

10. The charger system as claimed in claim 9, wherein the battery further comprises:
a charger side EPROM, and
a capacitor electrically coupled in parallel to the resistor,
wherein the charger circuit further comprises:
  a microcontroller programmed to:
    read data from the charger side EPROM,
and further wherein the diode, the capacitor, and the resistor form a time constant which keeps the transistor gate biased on while the microcontroller is reading the data.

11. A charger system for a portable host device comprising:
a charger circuit;
a battery coupled between the portable host device and the charger circuit; and
the portable host device
wherein a charging status is communicated from the charger circuit, using a charger side communication line to the battery, through the battery to the portable device when the charger circuit is charging the battery and a charge completed status is communicated to the portable device, the charge completed status indicated when the charger circuit is not connected to the battery and when the charger circuit is connected to the battery and the battery is completely charged;
wherein the battery comprises:
  a first memory device connected with the portable host device independent of the charge status but readable only by the host device when the charge status is the charge completed status; and
  a second memory device connected with the charger circuit independent of the charge status through the charger side communication line.

12. The charger system as claimed in claim 11, wherein the battery comprises a switch that is switched by a voltage of the charger side communication line such that a connection between the battery and the portable host device is grounded to indicate the charging status and the connection between the battery and the portable host device is not grounded to indicate the charge completed status.

13. The charger system as claimed in claim 11, wherein the battery further comprises a switch that is switched by a voltage of the charger side communication line such that the first memory device is enabled to communicate with the portable host device in one switch state or the connection of the first memory device to the portable host device is grounded in another switch state.

14. The charger system as claimed in claim 11, wherein the battery further comprises a switch, a delay and first and second memory devices disposed on opposite sides of the switch, the first memory device is accessible to the charger circuit when the battery is charging while the switch and delay prevent the second memory device from being accessible to the portable host device when the battery is charging.

* * * * *